(12) United States Patent
Jelmyer

(10) Patent No.: US 6,766,608 B1
(45) Date of Patent: Jul. 27, 2004

(54) APPARATUS FOR BAIT HARNESS

(76) Inventor: Larry Jelmyer, 20 Dubost Ct., Danville, CA (US) 94526

( * ) Notice: Subject to any disclaimer, the term of this patent is extended or adjusted under 35 U.S.C. 154(b) by 0 days.

(21) Appl. No.: 10/208,539

(22) Filed: Jul. 30, 2002

(51) Int. Cl.$^7$ .......................... A01K 83/00; A01K 83/06
(52) U.S. Cl. ..................... 43/44.2; 43/43.16; 43/44.8
(58) Field of Search .............................. 43/43.16, 44.2, 43/44.8

(56) References Cited

U.S. PATENT DOCUMENTS

| | | | | |
|---|---|---|---|---|
| 1,055,104 A | * | 3/1913 | Van Norsdall | 43/43.16 |
| 1,152,698 A | * | 9/1915 | Bonner | 43/43.16 |
| 2,865,131 A | * | 12/1958 | Ellis | 43/43.16 |
| 5,113,616 A | * | 5/1992 | McManus | 43/44.83 |
| 5,537,774 A | * | 7/1996 | Muhammad | 43/43.16 |

* cited by examiner

Primary Examiner—Kurt Rowan
(74) Attorney, Agent, or Firm—Charles L. Thoeming

(57) ABSTRACT

A swivel bait harness for receiving and holding live fish and allowing three dimensional movement of the hook portion of the harness under the forces generated by a fighting fish under commercial or sport fishing applications. The hook is rotatably secured within a first cylinder which is flexibly affixed to a front shank for attachment to conventional swivel and fishing lines. Alternate embodiments use the teachings of the present invention together with known bait harness components to provide a rigid harness for ease of applying bait and novel dynamics of the hook while the harness is used for fishing.

6 Claims, 4 Drawing Sheets

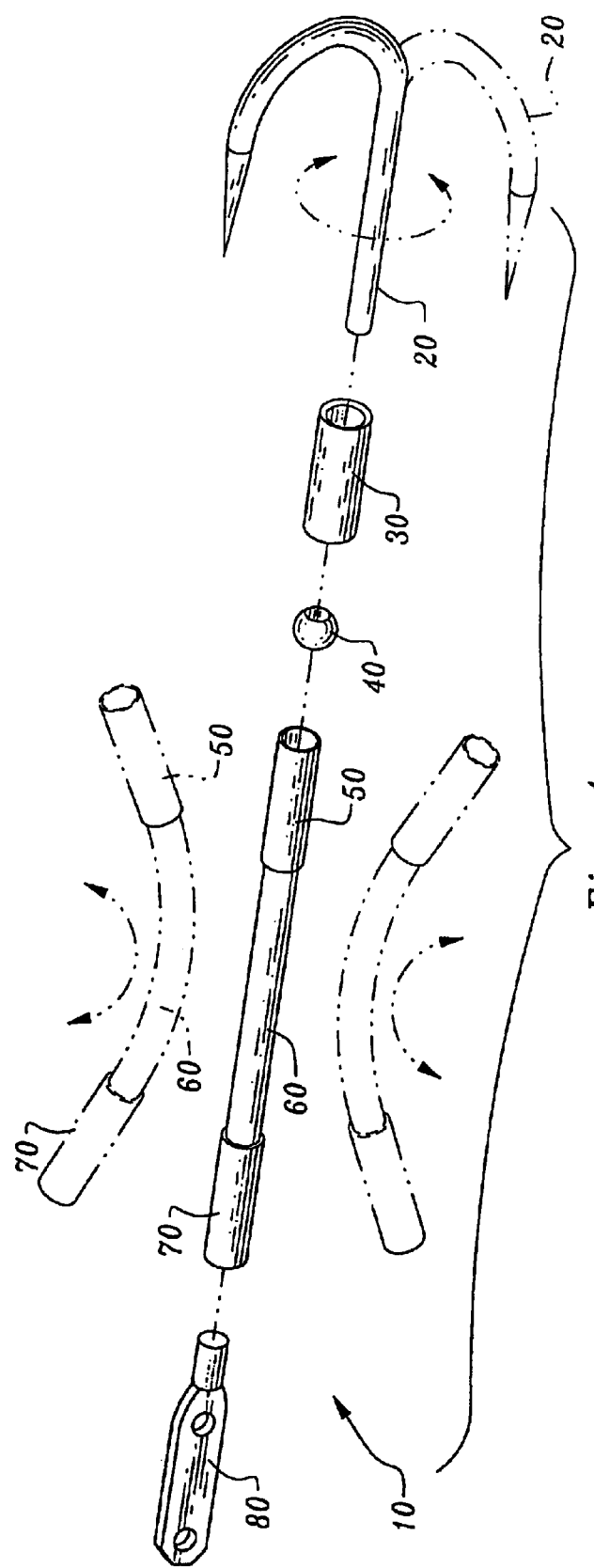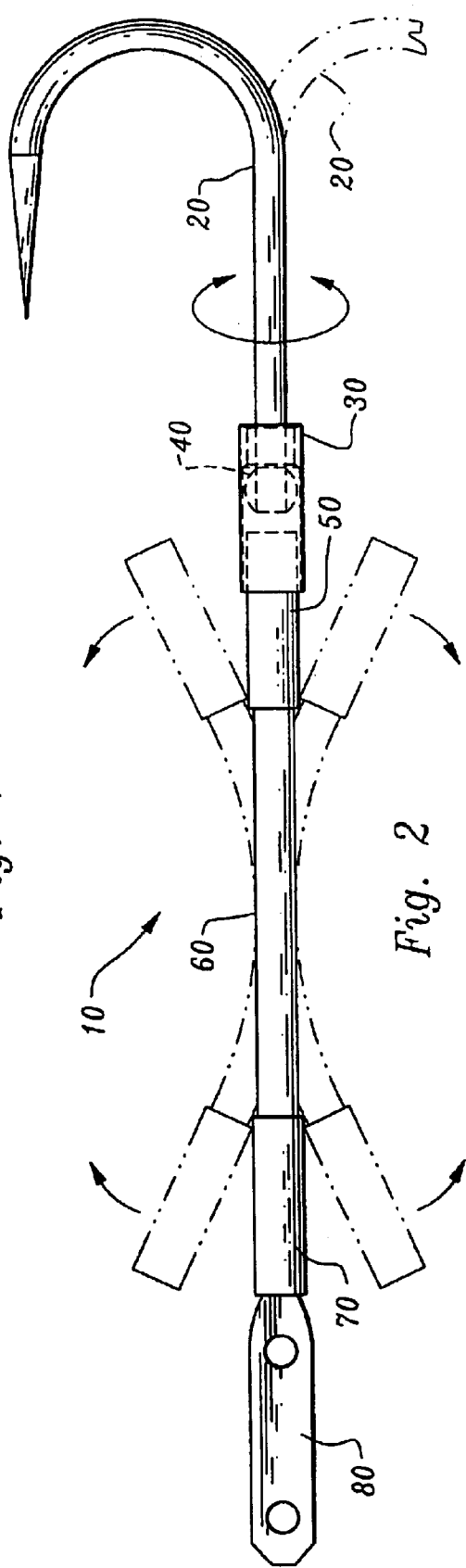

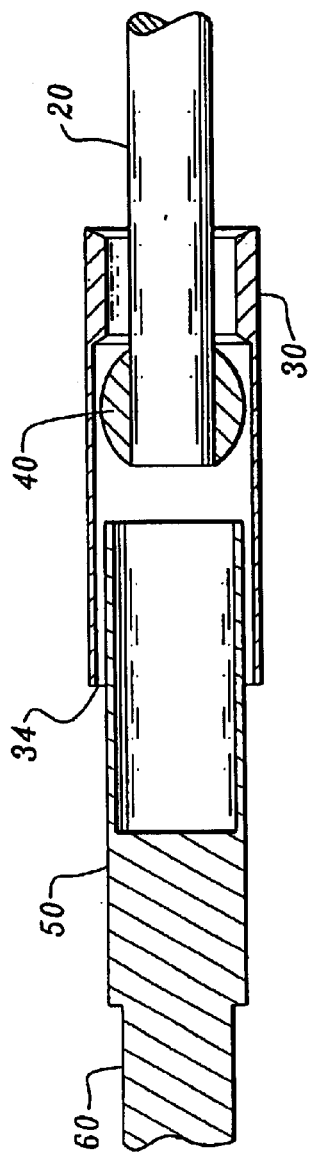
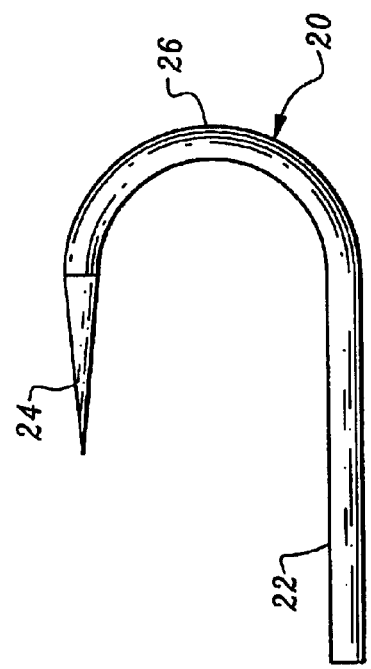
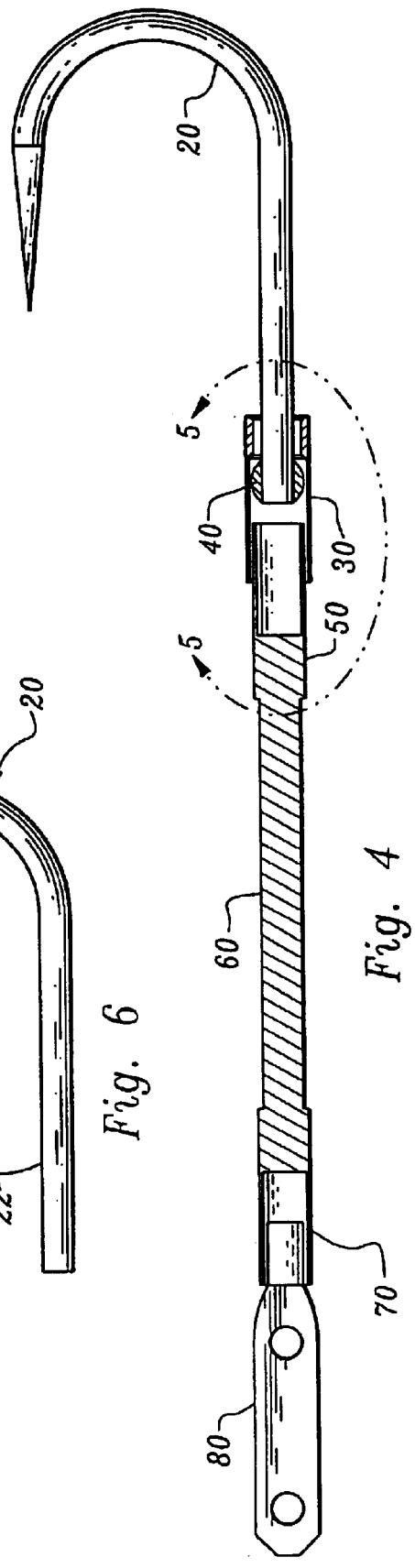

APPARATUS FOR BAIT HARNESS

CROSS-REFERENCES TO RELATED APPLICATIONS

None.

STATEMENT REGARDING FEDERALLY SPONSORED RESEARCH OR DEVELOPMENT

None.

REFERENCE TO A MICRO-FICHE APPENDIX

None.

BACKGROUND OF THE INVENTION

1. Field of the Invention

The present invention relates to bait harnesses for commercial or sport fishing applications. Existing regulations proscribe bait harnesses using barbed-type fishing hooks for certain commercial and sport fishing, such as salmon fishing. These regulations were adopted to reduce the numbers of fish killed or injured as a result of damage to the mouths of the fish resulting from barbed fishing hooks. Barbless-type bait harness hooks, however, present numerous problems for commercial or sport fishermen. Prolonged fighting by fish hooked on a rigid type bait harness also seriously damages the mouth of the fish. Additionally, a rigid bait harness often deforms or bends from extreme force vectors presented during prolonged fish fighting periods. Such harness deformation often results in loss of the badly injured or dead fish and destruction of the harness. The improved bait harness of the present invention solves the problem and limitations of the prior art by providing swivel dynamics at the point of attachment to the harness of the barbless type hook. By use of the present invention, damage to hooked fish is minimized. At the same time, the present invention reduces the likelihood of hooked fish being lost as damaged or killed. Finally, the present invention presents a more durable bait tackle under present commercial or sport fishing regulations.

2. Description of the Related Art Including Information Disclosed Under 37 C.F.R. 1.97 and 1.98

A search of the prior art located the following United States patents which are believed to be representative of the present state of the prior art: U.S. Pat. No. 6,038,806, issued Mar. 21, 2000, U.S. Pat. No. 5,953,851, issued Sep. 21, 1999, U.S. Pat. No. 5,890,316, issued Apr. 6, 1999, U.S. Pat. No. 5,881,491, issued Mar. 16, 1999, U.S. Pat. No. 5,875,584, issued Mar. 2, 1999, U.S. Pat. No. D404,795, issued Jan. 26, 1999, U.S. Pat. No. 5,855,089, issued Jan. 5, 1999, U.S. Pat. No. 5,680,726, issued Oct. 28, 1997, U.S. Pat. No. 5,600,917, issued Feb. 11, 1997, U.S. Pat. No. 5,537,774, issued Jul. 23, 1996, and U.S. Pat. No. D370,048, issued May 21, 1996.

BRIEF SUMMARY OF THE INVENTION

It is therefore an object of the present invention to provide an improved bait harness with three dimensional pivotal characteristics.

It is a further object of the present invention to provide a bait harness that complies with present sport fishing and commercial fishing regulations for barbless type hooks.

It is yet another object of the present invention to provide a bait harness that improves the potential for landing a fish that is hooked by the harness assembly.

It is a further object of the present invention to provide a bait harness that provides minimal damage to the mouth and/or snout of fish hooked thereby.

It is yet a further aspect of the present invention to provide a bait harness which can remain rigid for insertion into the bait but still be able to swivel at the point of hook attachment to the harness.

In a further aspect of the present invention to minimize the mortality to juvenile fish or protected species of fish inadvertently hooked by a bait harness so that these fish can be released back to the environment.

In a still further aspect of the present invention novice sport fishermen will be more likely to land a fish hooked by the bait harness.

It is still a further object of the present invention to present a bait harness that is less damaging to inadvertently hooked waterfowl, thus allowing easier release thereof and minimized injury thereto.

It is another and further objective of the present invention to provide a bait harness safely applicable to a full range of fish sizes and species.

Other features, advantages, and objects of the present invention will become apparent with reference to the following description and accompanying drawings.

BRIEF DESCRIPTION OF DRAWINGS

FIG. 1 is an perspective view showing the separate elements of an embodiment of the present invention.

FIG. 2 is a side elevational view of the assembled elements of an embodiment of the present invention.

FIG. 3 is an end elevational view of an embodiment of the present invention.

FIG. 4 is a cross sectional side view A—A of the end elevational view of FIG. 3.

FIG. 5 is a cross-sectional detail view B of the tube, cylinder, and ball elements of FIG. 4.

FIG. 6 is a side view of the hook element of an embodiment of the present invention.

DETAILED DESCRIPTION OF THE INVENTION

Figure 7:
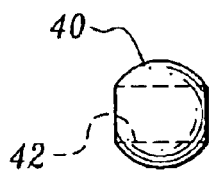
FIG. 7 is a side view of the ball element of an embodiment of the present invention.

The present invention of improved bait harness comprises a barbless type fishing hook which provides means for 360 degree range of motion and uniform flexibility about the longitudinal axis of the non-barbed end of the hook and means to attach the harness to standard a snap swivel at the end of a fishing line. The bait harness provides ease of threading bait onto the harness by virtue of the relatively rigid characteristic of the harness about the longitudinal harness axis.

With reference to the referenced drawings, an embodiment of the present improved bait harness invention is described below. As shown in FIGS. 1, 2 and 6, an embodiment of the improved bait harness 10 comprises a barbless hook 20 further comprising a J-shaped shank 26 having a pointed, barbless back end 24 for hooking and a straight rod front end 22, a first cylinder 30, a spherical member or ball 40, a second cylinder 50, a flexible cable 60, a third cylinder 70, and a front end shank member with flattened end 80 adapted to attach to a standard snap swivel at the end of a fishing line. In th preferred embodiment of the present invention designed to hold 4 inch to 6 inch bait, the hook length measured from the straight rod front end to the farthest point on the J-bend is 2 inches.

Figure 9:
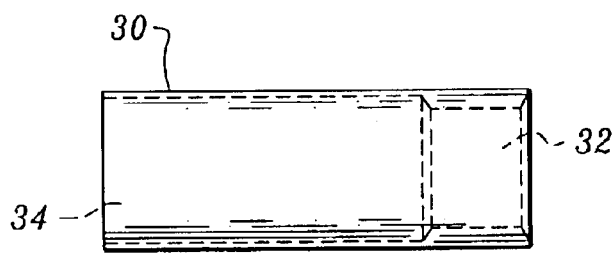
FIG. 9 is a side view of a cylinder element of an embodiment of the present invention.
Figure 10:
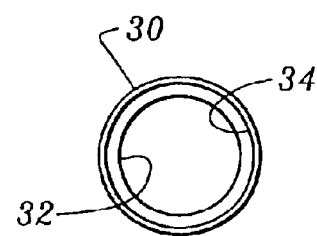
FIG. 10 is an end view of the rod element of an embodiment of the present invention.

FIG. 2 shows the elements of FIG. 1 in unison with a cut away view of the first cylinder 30 showing the differing internal diameters of the first cylinder 30, where, as further depicted in FIGS. 9 and 10, the internal diameter 32 of one end of the first cylinder 30 is less than the internal diameter 34 of the other end of the first cylinder 30, so that the first cylinder can receive and hold the spherical member or ball 40 fixedly attached to the straight rod front end 22 of the J-shaped hook 20. In the preferred embodiment of the present invention, the first cylinder 30 is made of stainless steel, is 0.625 inches in length, has an outside diameter of 0.250 inches, and one end having an internal diameter 0.203 inches for 0.500 inches in length of the cylinder and an internal diameter of 0.156 inches for the balance of the length of the first cylinder.

As shown in FIG. 3, the spherical member or ball 40 fixedly attached to the straight rod front end of the J-shaped hook 20 and is aligned with the longitudinal axis of the straight rod front end of the J-shaped hook 20 so as to allow 360 degree rotation about the longitudinal axis. The cross-sectional side view depicted in FIG. 4 and detail B as shown in FIG. 5 further show the alignment of the sphere 40 affixed to the straight rod front end 22 of the hook 20 within the smaller internal diameter 32 of the first cylinder 30 to allow the pointed back end 24 of the hook 20 to rotate 360 degrees about the longitudinal axis of the straight rod front end 22 of the hook 20. Positioning the point of 360 rotation on the end, and along the longitudinal axis, of the straight rod front end 22 of the hook 20 is critical to the optimum operation of the present invention to offset the forces exerted by a hooked fish fighting against the bait harness. The smaller internal diameter 32 is sized to allow the free rotation of the straight rod front end 22 360 degrees around the longitudinal axis of the straight rod front end while keeping the sphere 40 from disconnecting from the bait harness 10. For the preferred embodiment of the present invention, the stainless steel sphere 40 has an outside diameter of 0.188 inches and an 0.098 inch opening, aligned with the sphere central axis and sized to receive and be tig welded to the hook straight rod front end 22.

Figure 8:
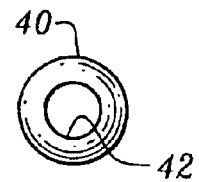
FIG. 8 is an end view of the ball element of an embodiment of the present invention.

FIGS. 7 and 8 provide details of the sphere or ball 40 including the opening 42 aligned through the central axis of the sphere or ball 40. The opening 42 is sized to receive and be fixedly attached to the straight rod front end 22 of the hook 20, as detailed in FIGS. 4 and 5. The sphere or ball 40 element of the present invention can be replaced by a commercial grade swivel, such as the P-Line Dura Max swivel known in the art. Such swivel substitute can be fixedly attached to the to the straight rod front end 22 of the hook 20 and one end of the flexible cable 60 the by tig welding, or similar means. In such substitute embodiment of the present invention, the second cylinder 50 and first cylinder 30, are optional, and can be eliminated depending upon the application intended by the user.

Figure 11:
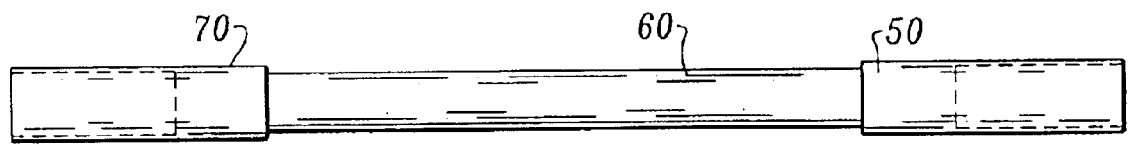
FIG. 11 is a side view of the assembled cable element and cylinder elements of an embodiment of the present invention.

FIG. 11 provides the assembled detail for the second cylinder 50 and third cylinder 70 and the flexible cable 60. The cylinders 50 and 70 are identically sized to receive the cable into one open end of the cylinders and be fixedly attached thereto. The other end of the second cylinder 50 is sized to be inserted into and fixedly attached to the large internal diameter 34 of the first cylinder 30. Positioning the point of flexibility along the longitudinal axis of the straight rod front end is essential to provide optimal dynamic response to the forces exerted upon the present invention by a hooked fish fighting against the harness. For the preferred embodiment of the present invention, the second cylinder 50 is stainless steel, is 0.625 inches in length, and has a fixed cross-sectional internal diameter of 0.203 inches with one end inserted into and tig welded to large diameter end of the first cylinder 30 and the other receiving and tig welded to 0.203 inches of one end of a 2 inch length of the flexible stainless steel cable 60 of fixed cross-sectional diameter slightly less than the internal diameter of the second cylinder 50. This cross-sectional dimension of the flexible stainless steel cable 60 of the present invention is critical to provide the semi-rigid properties of the apparatus necessary for ease in applying bait to the harness, while affording the necessary flexibility to the movement about the harness longitudinal axis when engaged by a live fish. The third cylinder 70 of the preferred embodiment is constructed of stainless steel, is 0.625 inches in length and has a fixed cross-sectional internal diameter of 0.203 inches with one end receiving and tig welded to the end of flexible cable 60 not attached to the second cylinder 50.

Figure 12:
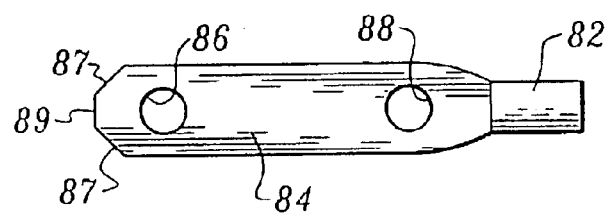
FIG. 12 is an side view of the flattened line attachment element of an embodiment of the present invention.

FIG. 12 shows the front end shank member with flattened end 80 adapted to attach to a standard snap swivel at the end of a fishing line. The shank 80 comprises a cylindrical back end 82 sized to be received and fixedly positioned into the end of the third cylinder 70 not housing the flexible cable. The shank further comprises a flattened end 84 comprising two equal sized openings, 86 and 88, centered on and passing through the longitudinal axis of the flattened end, and a front end edge comprising two sides tapered at 45 degree angles 87 to a flat nose 89. One of the equal sized openings, 88, is used for securing the bait to the bait harness 10 after the rigid harness is inserted into the bait body tail end along the longitudinal axis of the harness flattened end, and through the bait body longitudinal axis until the flattened end emerges from the bait body mouth. The bait is then secured to the harness by insertion of the bait pin through the opening 88 and wrapping the bait hook wire around the head of the bait. The other equal sized opening, 86, is used to secure the bait harness to the fishing line.

For the preferred embodiment of the present invention, the 1.70 inch stainless steel front end shank 80 comprises a 0.38 inch rod back end 82 fixedly positioned into the end of the third cylinder 70 not housing the flexible cable and tig welded thereto and a 1.32 inch flattened end 84 comprising two 0.095 inch diameter openings, 86 and 88, 0.50 inches apart from the centerline of each opening, centered on and passing through the longitudinal axis of the flattened end 84, wherein the centerline of the first opening 86 is 0.14 inches from the front end of the flattened end 84, and wherein the flattened end 84 has a height of 0.187 inches and an end comprising two 0.06 inch sides tapered at 45 degree angles to a flat nose front end.

Figure 13:
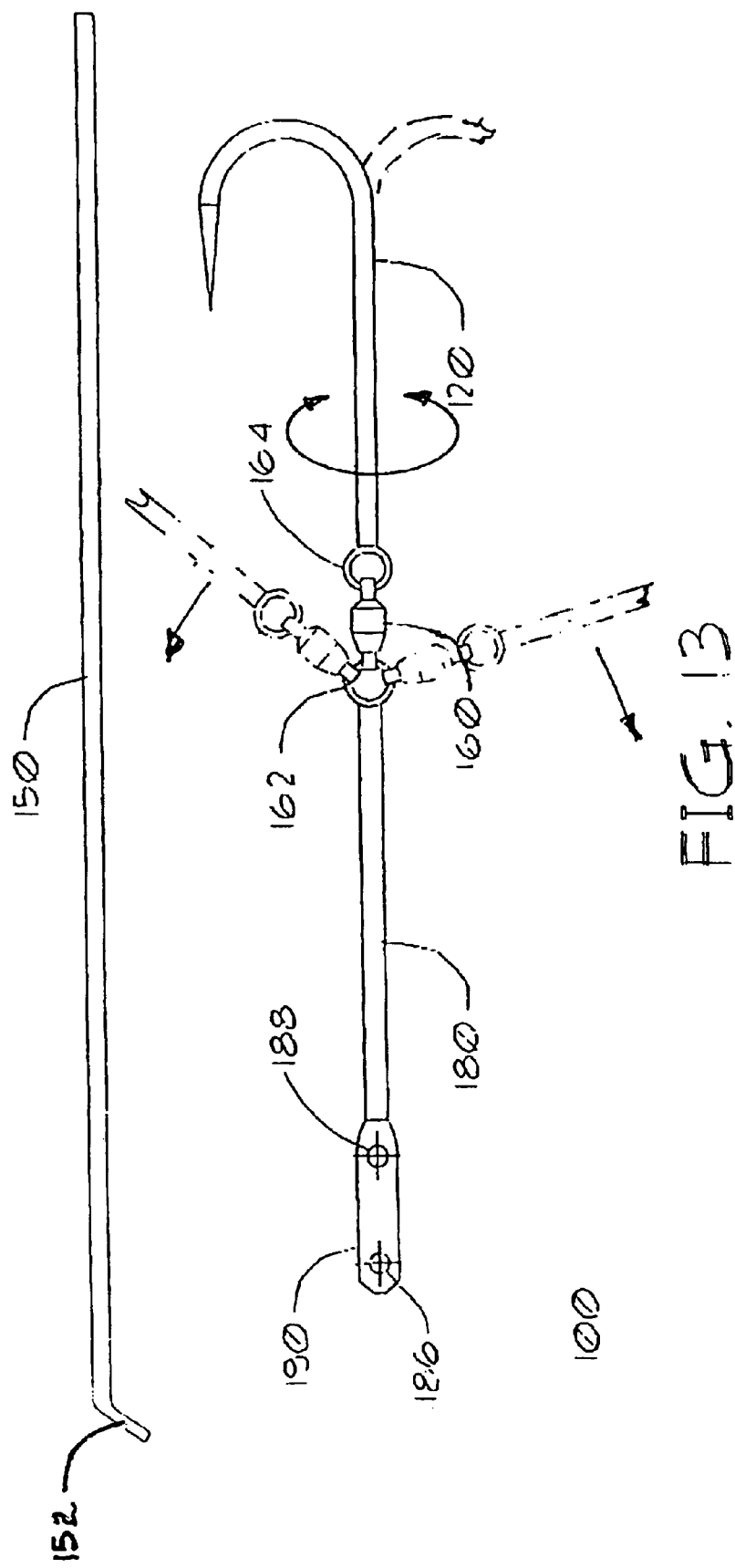
FIG. 13 is a side view of another embodiment of the present invention.

Another embodiment of the present invention 100 is depicted in FIG. 13. As shown in FIG. 13, this alternate embodiment of the improved bait harness 100 comprises a hook 120 comprising a J-shaped shank of predetermined length and predetermined diameter and having a pointed, barbless back end for hooking and a straight rod front end welded, or otherwise fixedly connected, to a ring 164, a rod 180 of predetermined length and predetermined diameter and having an angled end 152, a front end shank member 180 with one end welded, or otherwise fixedly connected, to a ring 162 and a flattened end 190 comprising two openings, 186 and 188, of equal diameter and both of which are centered along the longitudinal axis of the flattened end 190. Opening 186 is further adapted to attach to a standard snap swivel at the end of a fishing line, and opening 188 is further adapted to tie-in bait.

As further depicted in FIG. 13, the ring 164 attached to the straight rod front end of the hook 120 and the ring 162 attached to the shank member 180 are rotatably attached to ends of a commercial grade swivel 160, such as the P-Line Dura Max swivel, known in the art. The ring attachments to the swivel provide the swivel a free range of motion about the longitudinal axis of both the shank member and straight rod front end. As such, this embodiment of the present invention 100 provides nearly 360 degree range of motion of the hook 120 about the longitudinal axis of the apparatus.

This embodiment of the apparatus is adapted to a rigid state for bait attachment by inserting the angled end 152 of the rod 180 into the opening 186 and aligning the rod 180 along the shank member 180 and the straight rod front end of the hook 120. The resulting rigid apparatus flattened end 190 is inserted into and through the bait from the bait body tail. Once the flattened end 190 emerges through the bait body mouth, the bait is tied off using opening 188. The cylindrical rod 180 is then released from the opening 186, pulled through the bait, and removed from the baited harness.

The elements of the present invention can be constructed of any strong, rust-resistant material such as stainless steel or high strength graphite.

Although the foregoing description concerns what is presently considered to be the most practical and preferred embodiments, it is understood that the present invention is not to be limited to the disclosed embodiments but, on the contrary, is intended to cover various modifications and equivalent arrangements included within the spirit ans scope of the appended claims.

I claim:

1. An improved bait harness a apparatus comprising;
   a) a hook comprising a J-shaped shank having a pointed back end for hooking and a straight rod front end having a longitudinal axis which by extension defines a longitudinal axis for the bait harness;
   b) first means for securing the hook while allowing the hook pointed end to rotate 360 degrees along the longitudinal axis of the straight rod front end, wherein the first means securing the hook further comprises a sphere of predetermined outside diameter and central axis with an opening aligned with the sphere central axis and sized to receive and be fixedly attached to the straight rod front end, and a swivel mechanism having two ends, with one end fixedly attached to the straight rod front end;
   c) second means for securing the hook and first securing means while allowing the bait harness to uniformly flex along the longitudinal axis of the bait harness, wherein second means for securing the hook and first securing means further comprises a predetermined length comprising flexible material having fixed cross-sectional diameter and two ends, and a second cylinder of predetermined length and uniform internal and external diameter wherein one end of the second cylinder receives and is fixedly attached to one end of the flexible material and the other end is inserted and fixedly attached into the larger diameter of the first cylinder;
   d) means to secure the second securing means to fishing line; and
   e) means to secure bait to the bait harness by attachment to the means to secure the second securing means to fishing line.

2. The apparatus according to claim 1 wherein second means for securing the hook and first securing means further comprises a third cylinder of predetermined length and uniform internal and external diameter with a fixed cross-sectional internal diameter with one end receiving and fixedly attached to the end of the flexible material not attached to the second cylinder.

3. The apparatus according to claim 2 wherein means to secure the second securing means to fishing line and to secure bait to the bait harness further comprises a shank having predetermined length comprising a rod back end sized to be fixedly positioned into the end of the third cylinder not housing the flexible material thereto and a flattened front end comprising at least two openings centered on and passing through the longitudinal axis of the flattened end, wherein means to secure the second securing means to fishing line is provided by at least one such opening, and wherein means to secure bait to the bait harness is provided by at least one such opening.

4. The apparatus according to claim 3 wherein the flexible material, the hook, the cylinder, and the shank further comprise stainless steel and graphite.

5. An improved bait hook apparatus comprising:
   a) a hook comprising a stainless steel J-shaped shank having a barbless, pointed back end for hooking and a straight rod front end;
   b) a stainless steel sphere comprising a central axis with an opening aligned with the sphere central axis and sized to receive and be tig welded attached to the hook straight rod front end;
   c) a first stainless steel cylinder of predetermined length and outside diameter with one end having an internal diameter slightly greater than the diameter of the hook straight rod front end but less than the sphere outside diameter and less than the internal diameter of the balance of the length of the cylinder, wherein the internal diameter of the balance of the cylinder is sized to receive the sphere;
   d) a second stainless steel cylinder of predetermined length and uniform internal and external diameter wherein one is inserted and tig welded into the larger diameter of the first cylinder;
   e) a predetermined length of flexible stainless steel cable of fixed cross-sectional diameter wherein one cable end is inserted and tig welded into the end of the second cylinder not welded to the first cylinder;
   f) a third stainless steel cylinder of predetermined length and uniform internal and external diameter wherein one end of the third cylinder receives and is tig welded to the end of the cable not inserted and welded into the second cylinder; and
   g) a stainless steel shank having predetermined length comprising a rod back end fixedly positioned and tig welded into the end of the third cylinder not housing and welded to the cable and a flattened front end comprising at least two openings centered on and passing through the longitudinal axis of the flattened end to receive standard fishing line and further comprising two equal length sides tapered at 45 degree angles to form a flat nose front end.

6. An improved bait hook apparatus comprising:

a) a hook comprising a stainless steel J-shaped shank with a barbless, pointed back end for hooking and a straight rod front end and wherein the hook length measured from the straight rod front end to the farthest point on the J-bend is 2 inches;

b) a stainless steel sphere comprising a central axis and further comprising an outside diameter of 0.188 inches with an 0.098 inch opening aligned with the sphere central axis and sized to receive and be tig welded to the hook straight rod front end;

c) a first stainless steel cylinder 0.625 inches in length and having an outside diameter of 0.250 inches with one end having an internal diameter 0.203 inches for 0.500 inches in length of the cylinder and wherein the internal diameter of the balance of the cylinder is 0.156 inches to receive the hook straight rod front end and attached sphere, and wherein the hook is allowed to freely rotate around the longitudinal axis of the hook straight rod front end through end of the rod having the reduced internal diameter;

d) a second stainless steel cylinder 0.625 inches in length having a fixed cross-sectional internal diameter of 0.203 inches with one end inserted into and tig welded to the large diameter end of the first cylinder;

e) a 2 inch length of flexible stainless steel cable of fixed cross-sectional diameter wherein one cable end is inserted into the 0.203 inch open end of the second cylinder and tig welded thereto;

f) a third stainless steel cylinder 0.625 inches in length having a fixed cross-sectional internal diameter of 0.203 inches with one end receiving and tig welded to the end of flexible cable not attached to the second cylinder; and g) a 1.70 inch stainless steel shank comprising a 0.38 inch rod end fixedly positioned into the end of the third cylinder not housing the flexible cable and tig welded thereto and a 1.32 inch flattened end comprising two 0.095 inch diameter openings, 0.50 inches apart from the centerline of each opening, centered on and passing through the longitudinal axis of the flattened end, wherein the centerline of the first opening is 0.14 inch from the flattened end, wherein the flattened end has a height of 0.187 inches and an end comprising two 0.06 inch sides tapered at 45 degree angles to a flat nose front end, and wherein the centerline of the opening closest to the flat nose front end is 0.14 inches from the flat nose front end of the flattened end.

* * * * *